June 5, 1951
M. F. CHUBB
2,555,301
PROCESS FOR PASTING BATTERY PLATES
Filed Nov. 13, 1944
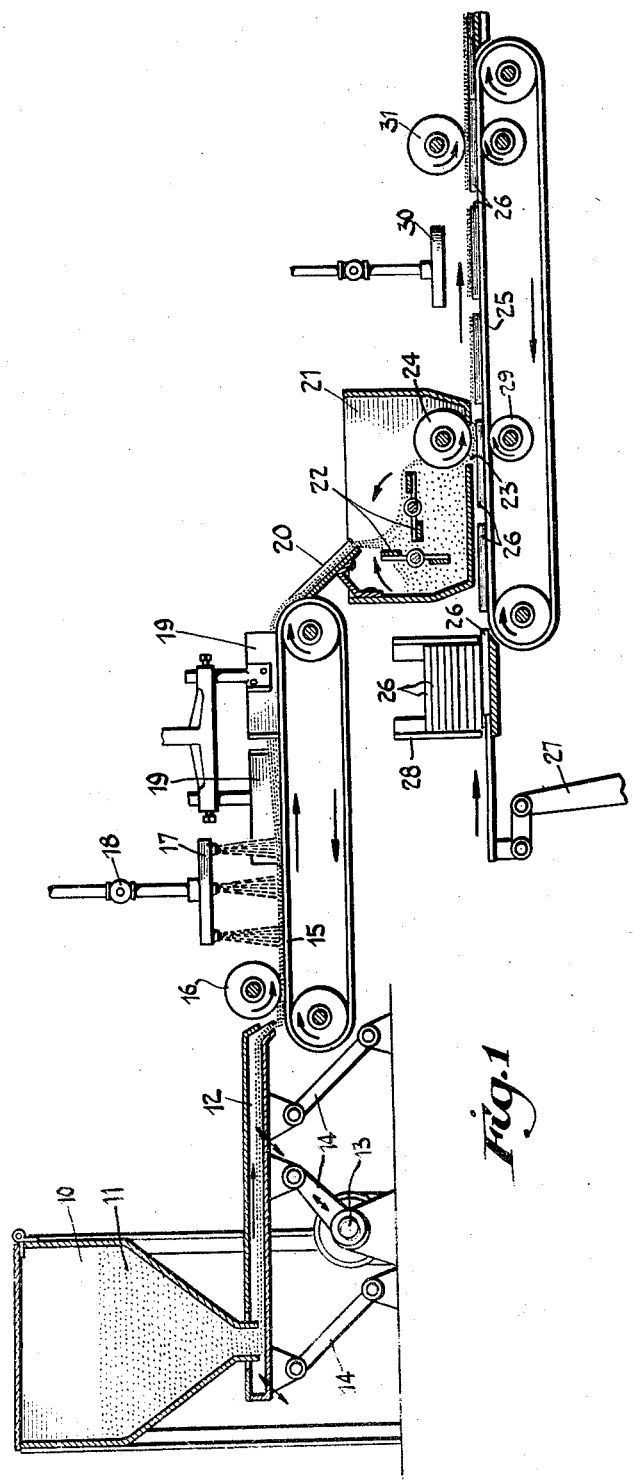
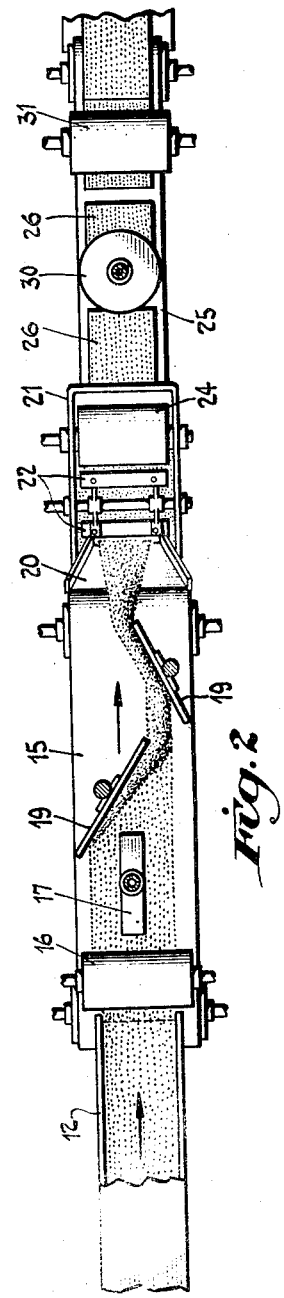
INVENTOR.
MELVIN F. CHUBB
BY Chester Tietig
ATTORNEY Patented June 5, 1951

2,555,301

UNITED STATES PATENT OFFICE 2,555,301

PROCESS FOR PASTING BATTERY PLATES

Melvin F. Chubb, Joplin, Mo., assignor to The Eagle-Picher Company, Cincinnati, Ohio, a corporation of Ohio Application November 13, 1944, Serial No. 563,274

6 Claims. (Cl. 136—67)

This invention is based on the discovery that blends of lead oxide and lead sulphate harden physically while reacting chemically and that this phenomenon may be utilized in the grid itself to produce a very durable plate. This effect is useful only if the blend is applied to the grid before the reaction takes place. Otherwise expressed, this chemical reaction would normally take place in the mixer, tending to produce a hard crumbly paste, difficult to apply to the grid in a manner to produce a good plate. However, this reaction, which is a disadvantage in the mixer, may be capitalized by having it take place in the grid. The type of hardening produced by this reaction in the grid is such as to produce a maximum of adhesion of the paste to the grid and a uniform texture on drying.

In order to take advantage of this reaction, a definite and predetermined time interval must be established between the mixing of the blend and the application of the mixture to the grid. This time interval may vary somewhat depending upon the components of the mixture of the blend and in each case there is some interval between the accomplishment of a thorough mechanical mixture and the hardening chemical reaction. The paste must be applied to the grid within this interval.

In order to establish and maintain the desired and prerequisite interval, the paste must be mixed either in very small batches or alternatively continuously, the latter method being recommended as the more feasible. Thus when the continuous mixing of the ingredients of the blend is employed in conjunction with an automatic process of applying the paste to the grid which determines and establishes the desired time interval, then the plates are uniform in physical consistency in that each plate has been treated with a quota of paste of the same physical and chemical composition. It therefore possesses the same degree of propensity to harden and adhere to the grid. Thus the plates may be further treated, assembled and processed by methods and under conditions most propitious to make the best plates rather than by methods and under conditions which are safe for the plates which are pasted under the less favorable conditions. The continuous process, therefore, provides not only plates which are better and more durable individually, but which are uniform and constitute a better battery collectively. The invention may also be practiced manually or by batch process machinery so long as the time limits between the time when the paste composition is first thoroughly mixed and the time at which the grid is completely filled with the mixed composition be between one-half minute and five minutes, depending upon the setting time of the paste composition. These limits also govern the operation of the continuous process.

In the processes conventionally employed, lead oxides together with any minor paste ingredients are placed in a paste mixer, and made into paste by the slow addition of dilute sulphuric acid or water and dilute sulphuric acid added separately. In any case, the operation is a time-consuming and critical one. The reaction between the lead oxide and the sulphuric acid is highly exothermic. The mixer must be water-cooled, or else the acid must be added very slowly, otherwise the paste temperature will rise too high and "dead" paste result. Furthermore, the acid must not be added too rapidly or the paste will be grainy and coarse in texture. It must then be cooled while mixing or it will "set up" or harden before it can be applied to the grids. The operation is furthermore a hazardous one to health, in that there is danger from lead dust inhaled when filling the mixer, or other incidents of handling. From one point of view, the conventional process is faulty for two reasons:

1. The setting reaction is occurring concurrently with the sulphate-forming reaction, therefore:

2. The degree to which the second reaction takes place depends upon the time interval between mixing and pasting, which is not the same for any two plates in a series pasted from a single mix. The properties of the plates are, therefore, not uniform.

In order to avoid the difficulties inherent in the prior art processes, it has been my object to cure the evil of lack of uniformity by continuously mixing and by deferring as long as possible the hardening of the paste so as to have as much of the reaction as possible take place within the grid or plate. One expedient to delay the setting reaction is to substitute lead sulphate and water for litharge and sulphuric acid. In the course of my investigation I discovered that on adding water to a mixture of lead oxide and normal or basic lead sulphate, an exothermic reaction of merely low grade occurred, there being on the average a 5° C. rise in temperature when 90 grams of litharge blended with 10 grams of basic lead sulphate was mixed with 10 milliliters of water. This was accompanied by a tendency to "set up" or harden, but the tendency is controllable. An average of 30° C. temperature rise occurs when 100 grams of litharge is mixed with 16 milliliters of 1.100 sulphuric acid, an equivalent sulphation of the final paste. It is my theory that the normal basic lead sulphate combines with the litharge to form a more basic lead sulphate, $(PbSO_4Pb(OH)_2)$, $(2PbSO_43Pb(OH)_2)$ or an even more basic product, or a mixture of such products which may even contain uncombined PbO.

In attempting to make use of this discovery, I then made battery pastes from various lead oxides and mixtures thereof blended with varying amounts of normal and basic lead sulphates, all mixed with water to pasting consistency (i. e., a density of 64 to 73 grams per cubic inch) in a conventional paste mixer. I found I could control the paste density by means of the amount of normal or basic lead sulphate used, and its degree of hydration. The greater the amount of sulphate and the greater the hydration, the lower the paste density. I found, however, that it was desirable to have a greater margin of safety, i. e., a greater time lag between the physical intermixing and the onset of the hardening reaction. In my search, I discovered one oxide preparation that reacted so slowly it could be pasted before the setting became pronounced. That preparation was made as follows and is covered by co-pending application Serial No. 557,146 to M. F. Chubb filed October 4, 1944, and now U. S. Patent No. 2,448,353, issued August 31, 1948.

I burned pre-milled litharge to a red lead content of about 30%, and omitting the sometimes included final step of re-milling, blended it with basic lead sulphate. To make a paste from it was a matter of only one or two minutes water mixing. Apparently the red lead coating on the outside of the particles slowed down the basifying reaction so that immediate pasting was possible. The plates, so made, dried to excellent strongly-bonded plates. I found, however, that I got especially good plates if I flash-heated and pressed the plates between absorbent cloth belts under rolls in accordance with my co-pending application, Serial No. 523,933, now U. S. Patent No. 2,474,091, and application, Serial No. 523,934, now abandoned, by Hershel Briggs and myself.

There are, therefore, two ways of increasing the delay between the mixing operation and the pasting step. They are:

1. Prolonging the mixing operation beyond the point at which the greatest tendency to set appears.
2. Using a special red-lead-coated fused litharge which has an inherently longer setting time.

The second of these alternatives is preferred although both lie within the scope of my invention. The reason for the preference is that the special coated litharge allows faster formation of the positive plates made with it and gives a bond to the grid which is superior in its resistance to sloughing off both during formation of the plate and the use of the battery.

Having originated lead oxide plus normal or basic lead sulphate blends that could be mixed rapidly and which would set, I originated a continuous paste mixer and process to make fullest use of this discovery.

In the accompanying drawing, Figure 1 illustrates diagrammatically my preferred apparatus in side elevation, partly in section.

Figure 2 is a plan view of the apparatus.

10 is a hopper which is kept filled with dry paste composition, 11; its lower end is arranged to deliver into a covered chute, 12, which is vibratable by means of an eccentric, 13, arranged to shake the chute, 12, by means of links, 14. The delivery end of chute, 12, is arranged to deliver dry paste composition on to a conveyor belt, 15.

As soon as the dry paste composition reaches the top of the conveyor belt, 15, it is spread out by a roll, 16, to a width of about two-thirds of the width of the conveyor belt. Subsequent to passing the roll, 16, it is wetted by water jets, 17. A valve, 18, is provided to regulate manually the quantity of water desired to make the paste. Subsequent to the water jets two scraper boards, 19, both of which are in contact with the belt, 15, at an angle to its travel are provided to bring the composition toward the middle of the belt so that no overflow takes place except to a chute, 20. The chute is attached to a paddle type mixer, 21, in which two plates, 22, revolve in opposite directions. The chute is arranged to deliver the paste directly over the paddles. The floor of the mixer has an opening, 23, in which a roll, 24, revolves over a second conveyor belt, 25, over which storage battery grids, 26, are delivered. The grids are fed to the belt, 25, by means of a conventional ejector mechanism, 27, over a magazine, 28. As the grids pass under the mixer they are filled with paste by the action of roll, 24, which also has the effect of leaving the sides of the grid filled flush with paste. An auxiliary roll, 29, co-operates with roll, 24, to press the grid into good contact with the latter, thereby insuring a full measure of paste. Subsequent to the mixer and paster on belt, 25, there is a radiant heat gas or electric heater, 30, which is arranged to momentarily subject the outer surface of the paste to a high heat. A gas flame from a Burdett type burner is preferred for this purpose. Subsequent to the burner there is another roll, 31, arranged to smooth down the surface of the paste and so eliminate any cracks which may have opened due to the heat of burner, 30.

It is to be understood that all parts of the machine described may be adjusted to the end that the various operations are in synchronism. The bottom opening of hopper, 10, may be adjustable; the speed of eccentric, 13, may be regulated, the pressure of rolls, 16, 24 and 31, are adjustable; the amount of water can be regulated, the speed of paddles, 22, is adjustable, and both conveyors can be adapted as to their speed to the demands of the process. The heat of burner, 30, can, of course, be regulated; likewise the angles which the boards, 19, make with the belt, 15, can be changed. It is evident, therefore, that the process which this apparatus is designed to perform is continuous, so long as paste-mixture, water, grids, heat and energy are supplied. The different adjustments are not merely for synchronism but are for adaption to various sizes and types of grids.

In carrying out my process using the continuous mixer illustrated, I may use the conventional lead oxides or oxide mixtures with as much basic or normal lead sulphate as will produce the desired paste density upon the addition of enough water to produce the desired paste consistency. The paste is agitated continuously either in the pug mill or in the pasting machine hopper, and thus remains plastic throughout a brief interval before it is incorporated into the grids. The secondary reaction then goes forward, setting the paste and bonding it to the grid firmly. If my preferred oxide preparation for positive plates is used, the secondary reaction is still further retarded and is best initiated by heating and pressing. My invention is not restricted to the use of any particular type of litharge, however. Any battery-maker's type may be used provided that the paste is applied to the grid before the setting reaction takes place.

Not only positive plates, but also negative ones may be pasted by the process and with the basic compositions disclosed. Since negative plate pastes usually contain barium sulphate, organic expanders, lampblack, etc. in small quantities, these conventional ingredients may be added to the dry litharge before any water or lead sulphates are added.

The following are examples of my process applied to both positive and negative plates and adjusted both to the use of my special coated oxide and to ordinary battery-maker's oxides:

EXAMPLES

For Positive Plates

*Formula A*

| | | |
|---|---|---|
| Litharge (battery grade) | per cent | 63 |
| Red lead (battery grade) | do | 25 |
| Basic lead sulphate | do | 12 |
| Water | cc./lb | 75 |
| Mixing time | sec | 10 |
| Paste density | g./cu. in | 67 |

*Formula B*

| | | |
|---|---|---|
| Specially prepared coated litharge | per cent | 88 |
| Basic lead sulphate | do | 12 |
| Water | cc./lb | 75 |
| Mixing time | sec | 30 |
| Paste density | g./cu. in | 67 |

*Formula C*

| | | |
|---|---|---|
| Leady litharge | per cent | 88 |
| Normal lead sulphate | do | 12 |
| Water | cc./lb | 75 |
| Mixing time | sec | 20 |
| Paste density | g./cu. in | 67 |

For Negative Plates

*Formula A*

| | | |
|---|---|---|
| Leady litharge | per cent | 89.3 |
| Basic lead sulphate | do | 10.0 |
| Inorganic expanders | do | .5 |
| Organic expanders | do | .2 |
| Water | cc./lb | 70 |
| Mixing time | sec | 25 |
| Paste density | g./cu. in | 70 |

*Formula B*

| | | |
|---|---|---|
| Battery grade litharge | per cent | 85.3 |
| Normal lead sulphate | do | 14 |
| Inorganic expanders | do | .5 |
| Organic expanders | do | .2 |
| Water | cc./lb | 80 |
| Mixing time | sec | 10 |
| Paste density | g./cu. in | 65 |

The proportions set forth in the foregoing formulae are illustrative only. The absolute limits are:

| | |
|---|---|
| Special coated litharge | 5% to 95% |
| Battery maker's litharge | 5% to 95% |
| Leady litharge | 5% to 95% |
| Basic lead sulphate | 5% to 30% |
| Normal lead sulphate | 5% to 30% |
| Water | 40 cc./lb. to 90 cc./lb. |
| Mixing time | 5 sec. to 5 min. |
| Paste density | 60 to 78 g./cu. in. |

A mixture of different kinds of litharge may be employed; also a mixture of basic and normal lead sulphate if desired.

I claim as my invention:

1. The process of continuously pasting battery plates which comprises continuously mixing a minor proportion of a powdered substance selected from the group consisting of basic lead sulphate and normal lead sulphate with a major proportion of powdered battery-maker's litharge, feeding a column of the thoroughly mixed resultant composition onto a surface having a substantially straight linear motion, subjecting the column of dry composition on said moving surface to a spray of water of sufficient but no more volume and duration than to create a paste, continuously displacing said wetted column from said moving surface into a space in which it is subject to a mixing action and then continuously discharging said mixed paste between a rotating cylindrical surface and a moving line of empty battery grids, said surface and said grids both moving in the same direction and in such close contact that the rotating surface presses said paste composition with sufficient force into said empty grids to continuously fill the latter and leave their top surfaces substantially smooth, the process being operated at such a speed that the time interval between thorough mixing and complete filling of the grids is between one-half minute and five minutes so that hardening of the composition takes place only in the grid after the filling thereof.

2. The process of continuously pasting battery plates which comprises continuously mixing a minor proportion of a powdered substance selected from the group consisting of basic lead sulphate and normal lead sulphate with a major proportion of powdered fused litharge coated with red lead, feeding a column of the thoroughly mixed resultant composition onto a surface having a substantially straight linear motion, subjecting the column of dry composition on said moving surface to a spray of water of sufficient but no more volume and duration than to create a paste, continuously displacing said wetted column from said moving surface into a space in which it is subject to a mixing action and then continuously discharging said mixed paste between a rotating cylindrical surface and a moving line of empty battery grids, said surface and said grids both moving in the same direction and in such close contact that the rotating surface presses said paste composition with sufficient force into said empty grids to continuously fill the latter and leave their top surfaces substantially smooth, the process being operated at such a speed that the time interval between thorough mixing and complete filling of the grids is between one-half minute and five minutes so that hardening of the composition takes place only in the grid after the filling thereof, and an exceptionally strongly bonded plate results which has fast forming properties and is resistant to sloughing off of the paste.

3. The process of continuously pasting battery plates which comprises continuously mixing a major proportion of one or more powdered lead oxides and a minor proportion of a powdered lead sulfate, feeding a column of the thoroughly mixed resultant composition onto a surface having substantially straight linear motion, adding water to the column of dry composition on said moving surface in only sufficient quantity to create a paste, continuously displacing said wetted column from said moving surface into a space in which it is subject to a mixing action, and then continuously discharging said mixed paste between an applicator surface and a moving line of empty battery grids, said surface and said grids moving in the same direction and in such close contact that the surface presses said paste composition with sufficient force into said empty grids to continuously fill the latter and leave their top surfaces substantially smooth, the process being operated at such a speed that the time interval between thorough mixing and complete filling of the grids is less than five minutes so that hardening of the composition takes place only in the grid after the filling thereof and an exceptionally strongly bonded plate results which has fast forming qualities and is resistant to sloughing off of the paste.

4. The process of continuously pasting battery plates which comprises continuously mixing a major proportion of one or more lead oxides with a minor proportion of a lead sulfate, adding only sufficient water to make a stiff paste, working the thus constituted paste mixture to distribute the water and then continuously discharging said mixed paste between a rotating cylindrical surface and a moving line of empty battery grids, said surface and said grids both moving in the same direction and in such close contact that the rotating surface presses said paste composition with sufficient force into said empty grids to continuously fill the latter and leave their top surfaces substantially smooth, the process being operated such that the time interval between thorough mixing of a given paste composition and complete filling of the grids therewith is between one-half minute and five minutes so that hardening of the composition takes place only in the grid after the filling thereof.

5. The process of continuously pasting battery plates which comprises continuously mixing a major proportion of powdered battery-makers' litharge and a minor proportion of a powdered substance selected from the group consisting of a basic lead sulfate and normal lead sulfate, adding only sufficient water to make a stiff paste, working the thus constituted paste mixture to distribute the water and then continuously discharging said mixed paste between a rotating cylindrical surface and a moving line of empty battery grids, said surface and said grids both moving in the same direction and in such close contact that the rotating surface presses said paste composition with sufficient force into said empty grids to continuously fill the latter and leave their top surfaces substantially smooth, the process being operated such that the time interval between thorough mixing of a given paste composition and complete filling of the grids therewith is between one-half minute and five minutes so that hardening of the composition takes place only in the grid after the filling thereof.

6. The process of continuously pasting battery plates which comprises continuously mixing a major proportion of powdered fused litharge coated with red lead and a minor proportion of a powdered substance selected from the group consisting of basic lead sulfate and normal lead sulfate, adding only sufficient water to make a stiff paste, working the thus constituted paste mixture to distribute the water and then continuously discharging said mixed paste between a rotating cylindrical surface and a moving line of empty battery grids, said surface and said grids both moving in the same direction and in such close contact that the rotating surface presses said paste composition with sufficient force into said empty grids to continuously fill the latter and leave their top surfaces substantially smooth, the process being operated such that the time interval between thorough mixing of a given paste composition and complete filling of the grids therewith is between one-half minute and five minutes so that hardening of the composition takes place only in the grid after the filling thereof.

MELVIN F. CHUBB.

REFERENCES CITED

The following references are of record in the file of this patent:

UNITED STATES PATENTS

| Number | Name | Date |
|---|---|---|
| 1,303,513 | Spencer | May 13, 1919 |
| 1,572,512 | Benner | Feb. 9, 1926 |
| 1,572,586 | Weir | Feb. 9, 1926 |
| 1,592,691 | Engel | July 13, 1926 |
| 1,649,579 | Edison | Nov. 15, 1927 |
| 1,654,778 | Benner et al. | Jan. 3, 1928 |
| 1,668,801 | Calbeck | May 8, 1928 |
| 1,723,609 | Edison | Aug. 6, 1929 |
| 2,182,479 | Johnstone | Dec. 5, 1939 |
| 2,300,627 | Merson | Nov. 3, 1942 |
| 2,448,353 | Chubb | Aug. 31, 1948 |